United States Patent [19]
Baker

[11] 3,775,669
[45] Nov. 27, 1973

[54] PROGRAMMABLE POWER SUPPLY CONTROLLED BY CHANGES IN LOAD CURRENT

[75] Inventor: Joseph R. Baker, San Diego, Calif.

[73] Assignee: Diagnostic Instruments, Inc., San Diego, Calif.

[22] Filed: June 8, 1972

[21] Appl. No.: 260,822

[52] U.S. Cl............................ 323/4, 250/322, 323/9, 323/20
[51] Int. Cl. ............................................... G05f 1/50
[58] Field of Search ................. 250/49.5 ZC; 323/4, 323/9, 19, 20

[56] References Cited
UNITED STATES PATENTS

| | | | |
|---|---|---|---|
| 3,590,323 | 6/1971 | Mapham et al. | 323/9 X |
| 3,414,774 | 12/1968 | Motta | 323/4 X |
| 3,604,925 | 9/1971 | Snelling et al. | 250/49.5 ZC |

Primary Examiner—A. D. Pellinen
Attorney—Edward A. Sokolski et al.

[57] ABSTRACT

A control system for controlling the supply of current to a load. The current to the load, which may comprise elements of an ionographic imaging system is sensed and when the peak thereof is reached, a level detector circuit initiates the operation of control circuits which control the supply of current to the load. The load current is maintained substantially constant by means of a power supply control which controls the output voltage of a programmable power supply during a predetermined period of time as measured by an integrator, which integrates a signal in accordance with the load current. The integrator operates to automatically cut off the supply of current to the load when the desired flow to the load has been attained.

7 Claims, 4 Drawing Figures

3,775,669

PROGRAMMABLE POWER SUPPLY CONTROLLED BY CHANGES IN LOAD CURRENT

BACKGROUND OF THE INVENTION

This invention relates to electrical power supplies, and more particularly to a system for programming the supply of current from a power source to a load in response to the sensed current flowing through such load.

In a coassigned patent application entitled Field Control In Imaging Systems, Ser. No. 158,172, filed June 30, 1971, an ionographic imaging system is described for depositing electrical charges on an insulative surface. In this system, the ionographic imaging process is accomplished in a gap formed between two electrodes. As noted in this application, a retarding field is built up as charges are deposited on the insulative surface, thereby tending to impair the efficiency of the process. In order to overcome this difficulty, the use of a controllable power supply is described by means of which the potential applied to the electrodes is increased as the charge is built up so as to keep the electric field and the current flow in the gap constant. Controllable power supplies are well known in the art. However, such prior art devices do not provide all of the control and indicating functions desired for efficient or essentially automatic operation of the equipment in question.

The system of the present invention involves a unique combination of circuitry which, in certain instances, automatically or, in others, semiautomatically provides all of the control functions necessary in supplying current in an optimum manner to a load of the type referred to above. It is to be noted that the control of the power supplied to ionographic imaging equipment noted previously is somewhat critical for the proper operation of such equipment, and hence accurate control thereof is necessary. The system of this invention is capable of providing such accurate control. This end result is achieved without the necessity for highly experienced or highly trained operators in view of the fact that the critical functions are accomplished automatically, so that the operation of the equipment is relatively foolproof. The system of the invention further includes various warning indicators for the operator so as to further lessen the possibility of improperly operating the equipment or of operating the equipment when a malfunction condition exists.

SUMMARY OF THE INVENTION

A signal in accordance with the current flow to a load is fed to a level detector and latch circuit and, when the specified level of such current (which level is approximately at the peak thereof) is reached, the latch circuit is actuated to provide a keying signal to initiate the operation of a power supply control circuit and an integrator circuit. A control signal is fed from the power supply control to a programmable power supply, this control circuit controlling the voltage output of the supply in such a manner as to maintain the current to the load substantially at the specified value. The integrator circuit effectively operates during the time which the current is fed to the load, and when a predetermined charge ∫idt has been collected, provides a switching control signal which operates an appropriate switching circuit to cut off the supply of current from the programmable power supply to the load. An evaluator circuit is provided to indicate when leakage in the load has exceeded predetermined tolerances, this evaluator circuit operating both to provide an indication of such unacceptable leakage and to automatically actuate the aforementioned switching circuit to cut off the supply of current to the load under such conditions. Indicators are provided to enable the operator to ascertain when the programmable power supply and the level detector and latch circuits are generating outputs. The system of the invention thus provides accurate current control functions with a minimum amount of operator attention.

It is therefore an object of this invention to provide an improved power supply control system for controlling the supply of current to a load.

It is another object of this invention to facilitate the operation of equipment such as an ionographic imaging system requiring accurate control of the current supply thereto.

It is a further object of this invention to provide a control system for automatically controlling the supply of current to a load in a predetermined optimum manner.

Other objects of this invention will become apparent as the description proceeds in connection with the accompanying drawings.

DESCRIPTION OF THE PREFERRED EMBODIMENT

Figure 1:
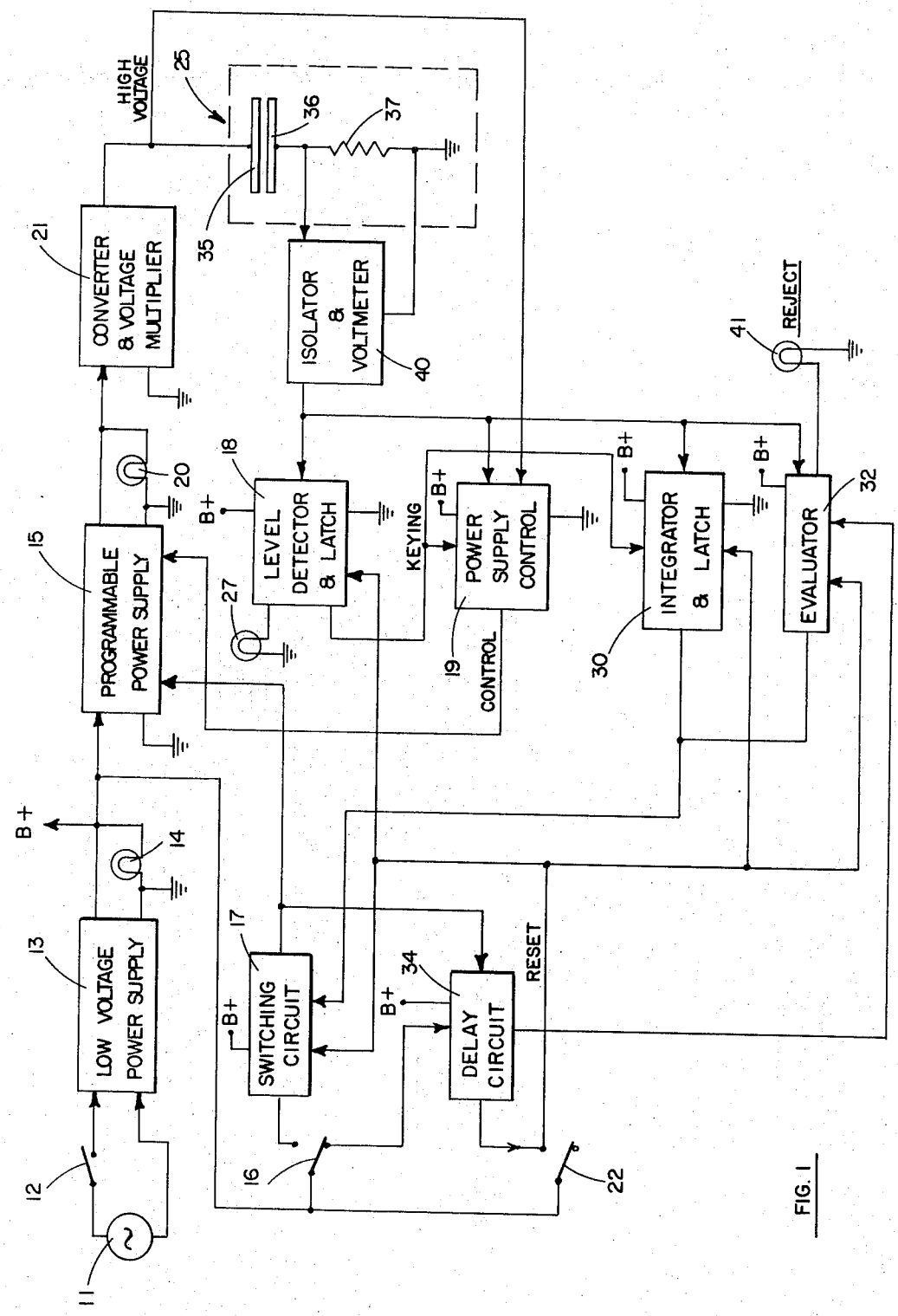
FIG. 1 is a functional block diagram of a preferred embodiment of the system of the invention.

Referring now to FIG. 1, a preferred embodiment of the system of the invention is illustrated. Power from AC power source 11 is fed through manually operable power switch 12 to low voltage DC power supply 13. Power supply 13 transforms the AC voltage to a DC voltage of a desired magnitude (e.g., 20 volts) and rectifies and filters this voltage to provide a DC output. This voltage output, which causes an indicator lamp 14 to be illuminated, is fed to programmable power supply 15 and other control circuits. When the operator wishes to provide current to load 25, which may comprise the exposure circuits 25 of an ionographic imaging system, he operates switch 16 to connect the output of low voltage power supply 13 to switching circuit 17. Switching circuit 17, which may comprise conventional electronic switching circuitry or relays, provides an actuation signal to programmable power supply 15 which activates this power supply. Programmable power supply 15 will thus commence producing a voltage output, this condition being indicated by indicator lamp 20.

The output of programmable power supply 15 is fed to converter and voltage multiplier 21 to produce a high voltage output from the converter and voltage multiplier to load 25.

It is to be noted at this point that prior to the time that switch 16 is thrown, the operator should momentarily close reset switch 22 if "reset" lamp 27 is illuminated. This momentary actuation of switch 22 provides a reset signal to level detector and latch 18, switching circuit 17, integrator and latch 30 and evaluator 32, to reset these circuits so that they are in condition for properly performing their various functions. In the event, however, that the operator should fail to momentarily actuate switch 22, a reset signal is automatically provided from delay circuit 34. This circuit, which may comprise a resistive-capacitive charge/discharge circuit, provides a delayed reset pulse in response to the closing of switch 16. Delay circuit 34 also provides a control signal to evaluator 32 which tends to prevent transients generated with the closing of switch 16 from affecting the operation of the evaluator by inhibiting the operation of the evaluation circuits for a short time period immediately after the switch is thrown during which time transient signals generated with the switching are likely to be present.

With the application of high voltage from converter and voltage multiplier 21 between electrodes 35 and 36 of the load, current will flow through resistor 37 and increases exponentially to a peak value. A voltage proportional to the current will thus be developed across resistor 37. An indication of the magnitude of this voltage is provided by means of voltmeter and isolator 40, this voltage also being fed from the voltmeter and isolator to the inputs of level detector and latch 18, power supply control 19, integrator and latch 30 and evaluator 32.

Evaluator 32 is a leakage detector circuit and, in the event that there is leakage in excess of a predetermined value or tolerance in the load or the circuits associated therewith, the circuits of leakage evaluator 32 will be actuated to illuminate "reject" lamp 41 indicative of this condition. Evaluator 32 when excessive leakage is indicated provides a signal to switching circuit 17 which actuates this circuit so as to cut off programmable power supply 15 and thus the high voltage output of converter and multiplier 21. Evaluator 32 may include a conventional level detector, such as a transistor with a bias applied to the emitter. When the bias level is overcome, the transistor turns on and the signal is coupled to an electronic latch circuit, which provides an actuation signal when the detector indicates leakage beyond predetermined tolerance limits.

Assuming that leakage, if any, is within tolerances, level detector and latch circuit 18, the operation of which is to be described in detail in connection with FIG. 2, detects the level of the current during X-ray exposure of load 25. Immediately after a predetermined level has been reached (approximately at the peak current), the detector will actuate a latching circuit which provides a keying signal to power supply control 19 and integrator and latch 30. This keying signal operates to activate both the power supply control and the integrator. Power supply control 19 is thus activated to provide a feedback or control signal to programmable power supply 15 as a function of the load current. More specifically, this control signal is responsive to the voltage received by the power supply control from resistor 37 and operates to control the voltage output of programmable power supply 15 in inverse relationship to any voltage change across resistor 37. Thus, when the current through the resistor tends to decrease, this being reflected by a corresponding decrease in voltage across the resistor, the power supply control signal will increase the voltage output of power supply 15 and of voltage multiplier 21, tending to prevent a decrease in current through the load. Similarly, when the current through resistor 37 tends to increase, reflected by an increase in voltage thereacross, the voltage to the load will decrease thereby also avoiding any significant increase in current. Thus, a servo loop is established once the specified current level has been reached, operating to maintain this current constant.

Power supply control 19 also receives a feedback signal from the high voltage output of converter and voltage multiplier 21, which tends to stabilize the response of the control action. The operation of power supply control 19 will be described in detail later in connection with FIG. 3. Programmable power supply 15 may be a conventional power supply having electronic voltage regulation circuits which are capable of varying the output voltage over a fairly wide range in response to an input signal.

Integrator and latch 30, which may comprise a resistive-capacitive integration circuit operating in conjunction with electronic amplification, such as for example a Miller integrator, is activated by the keying signal from level detector and latch circuit 18 when the predetermined current level is detected. When the keying signal is received, the integrator commences to effectively integrate the current received by the load with respect to time, and when the capacitance of the integration circuit has been charged to a predetermined potential, a latching circuit is actuated. The latching circuit of integrator and latch 30 provides an actuation signal to switching circuit 17, which causes this circuit to cut off programmable power supply 15, thus cutting off the supply of current to the load. Accordingly, integrator and latch 30 acts as an ionographic exposure control which controls the provision of current to the load for a predetermined period of time.

In this manner, operation of the power supply is automatically controlled for optimum operation of the load circuit. Indicators are provided so the operator can ascertain whether or not various portions of the system are operating, and an automatic as well as a manual reset is provided to assure that the circuits are ready for each successive operation of the ionographic apparatus or other load. Further, the evaluator determines when the load is not in proper condition for operation so as to avoid malfunctioning use.

Figure 2:
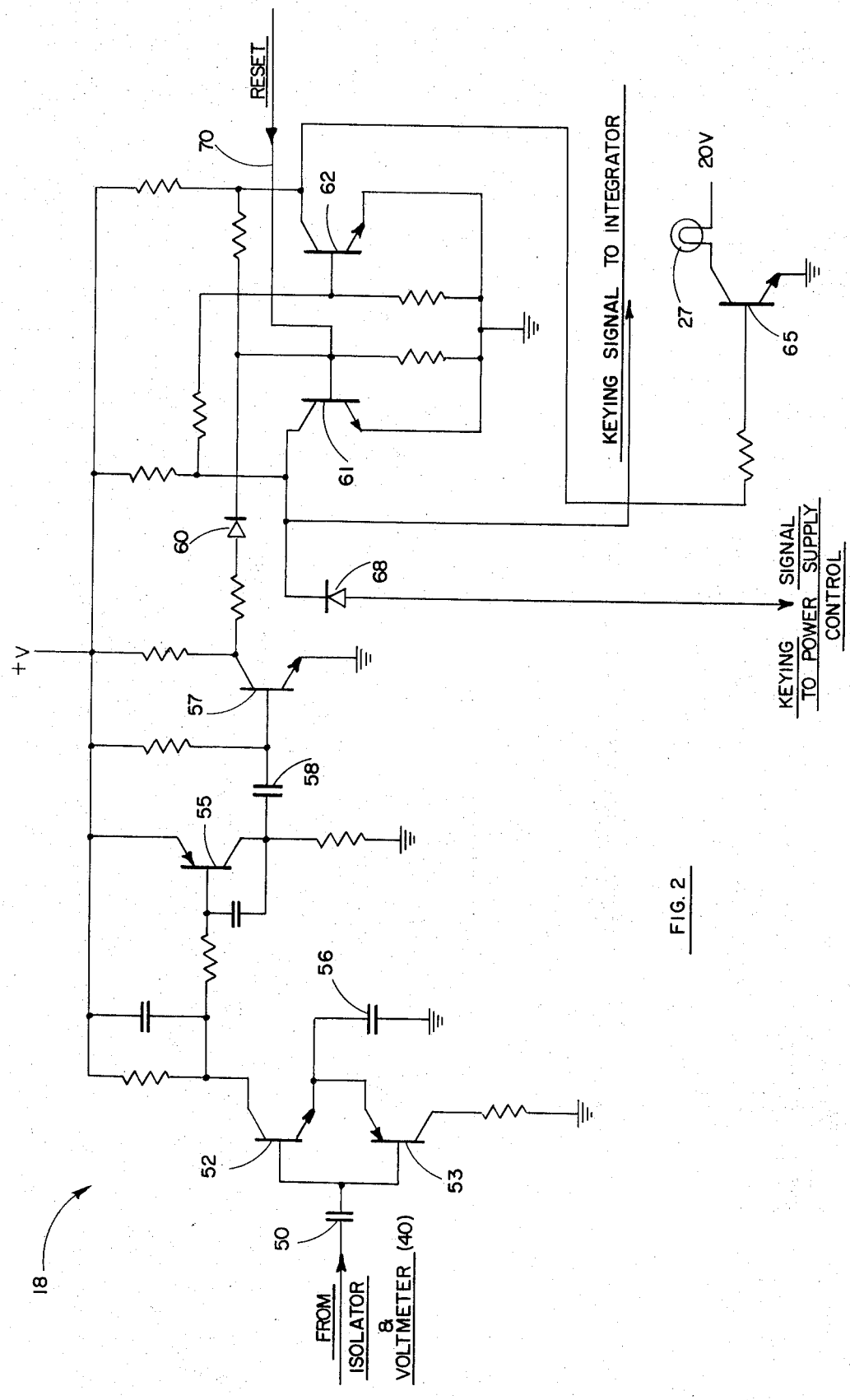
FIG. 2 is a schematic drawing illustrating one embodiment of the level detector and latch circuit of the present system of the invention.

Referring now to FIG. 2, one embodiment of a peak detector and latch circuit which may be utilized in the system of the invention is illustrated. The signal from the load resistor is fed through capacitor 50 to the bases of transistors 52 and 53. The emitter of transistor 52 has capacitor 56 connected thereto, the other end of the capacitor being connected to ground. Transistor 52, operating in conjunction with capacitor 56, forms a peak detection circuit for the signals fed to the base thereof through capacitor 50. With the arrival of a positive voltage at the base of transistor 52, transistor 52 starts to conduct, capacitor 56 charging to a voltage which follows the rising voltage on the base. As long as the voltage at the base of the transistor continues to rise, the transistor will continue to conduct. However, after the voltage reaches a peak and starts to fall off from the peak, the voltage at the base will drop below that at the emitter (stored by capacitor 56), and transistor 52 will be driven to cutoff. Transistor 52 has sufficient sensitivity so that it will be driven to cutoff just as the voltage at its base starts to drop so that such switching action will occur substantially at the peak.

The signal developed at the collector of transistor 52 with its being driven to cutoff is coupled to the base of transistor 55 and likewise drives this transistor to cutoff. This results in a negative going signal at the collector of transistor 55 which is coupled through capacitor 58 to the base of transistor 57. This negative going signal drives transistor 57 to cutoff, a positive going signal being coupled from the collector of transistor 57 through diode 60 to the base of a flip-flop stage including transistor 61. This positive going signal drives transistor 61 to conduction, this transistor driving its associated transistor 62 of the flip-flop stage to cutoff, the flip-flop latching in this condition. A positive going signal is thus provided at the collector of transistor 62, which signal drives transistor 65 to conduction, thereby causing indicator light 27 to be actuated. The negative going signal at the collector of transistor 61 provides a keying signal which is continuous (once initiated by detection of load current peaking) and which is fed through diode 68 to power supply control circuit 19 and directly to integrator and latch circuit 30. A reset signal for the flip-flop is provided on line 70 to the base of transistor 61. It is further to be noted that when the signal fed through capacitor 50 to the base of transistor 53 drops significantly below the voltage charge on capacitor 56, i.e., after the supply of current to the load is cut off, transistor 53 goes to the conductive state to provide a discharge path for capacitor 56, so that it is ready for a new cycle of operation.

Figure 3:
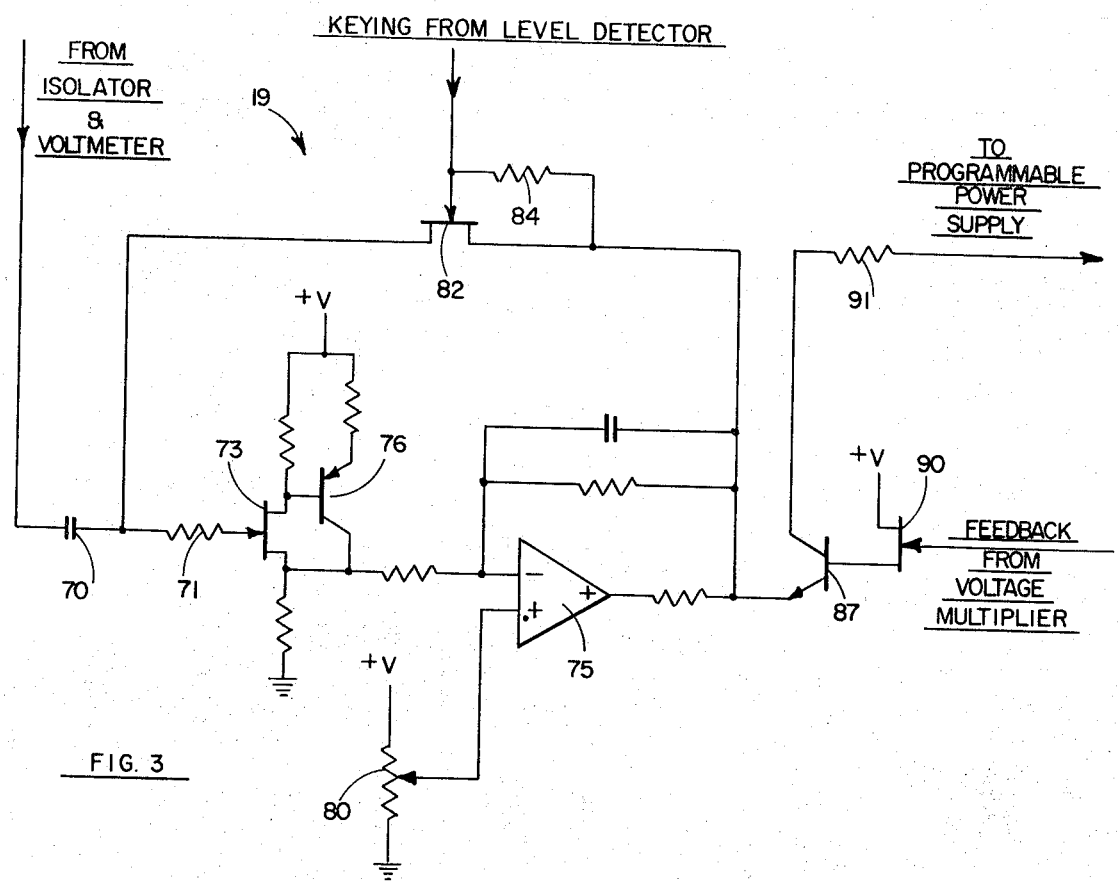
FIG. 3 is a schematic drawing of one embodiment of the power supply control circuit of the invention, and FIG. 4 graphically illustrates a typical current control function of the present system.

Referring now to FIG. 3, a power supply control circuit which may be utilized in the system of the invention is schematically illustrated. The signal from the load indicative of the current therethrough is fed through capacitor 70 and resistor 71 to the gate of field effect transistor 73. The output of field effect transistor 73 is fed from the source thereof to the inverting input of operational amplifier 75 which is a differential amplifier. Transistor 76 is used to stabilize the operation of the circuit. Potentiometer 80 is utilized to provide a reference voltage to the non-inverting input of differential amplifier 75. The arm of this potentiometer is adjusted to provide the desired current to the load. This potentiometer thus provides an internal adjustment for setting the current output ot suit the particular application requirements at hand.

Field effect transistor (FET) 82 is connected to form a bridge between the output of differential amplifier 75 and the input to field effect transistor (or so-called FET) 73. Prior to the time that the predetermined current level has been detected by the level detector 18, field effect transistor (FET) 82 is in its conductive state by virtue of the forward bias applied to the gate thereof through biasing resistor 84, providing a bypass circuit across differential amplifier 75. Thus, during this period the differential amplifier circuit acts as a voltage follower circuit, following the voltage at the non-inverting base and ignoring (to an extent determined by the "on" resistance of FET 82) the signal coming in to capacitor 70. Thus, during this initial period the current through transistor 87 (or an equivalent electronic valve means) is directly responsive to the initial conditions set up by means of potentiometer 80. When, however, the keying signal is fed to the gate of field effect transistor 82, the field effect transistor is driven to cutoff and the control signal at the emitter of transistor 87 now comes from differential amplifier 75. An increase in the current through the load results in a decrease in the voltage output of differential amplifier 75 and vice versa. The collector of transistor 87 is connected through resistor 91 to the voltage control circuit of the programmable power supply so as to control the voltage output thereof. The control signal is fed to the programmable power supply so that any tendency for the current through the load to decrease will result in an increase in the output voltage of the programmable power supply, and vice versa. A further feedback signal is fed to the gate of field effect transistor 90 from the output of the voltage multiplier. The source of FET 90 is interconnected onto the base of transistor 87 to provide a control or feedback signal therefor. This further feedback signal operates to stabilize and increase the sensitivity of the current control as the high voltage output is varied in response to the control signal. While transistors are shown in the above-described circuitry, it will be understood that other types of electronic valve means instead may be employed.

Figure 4:
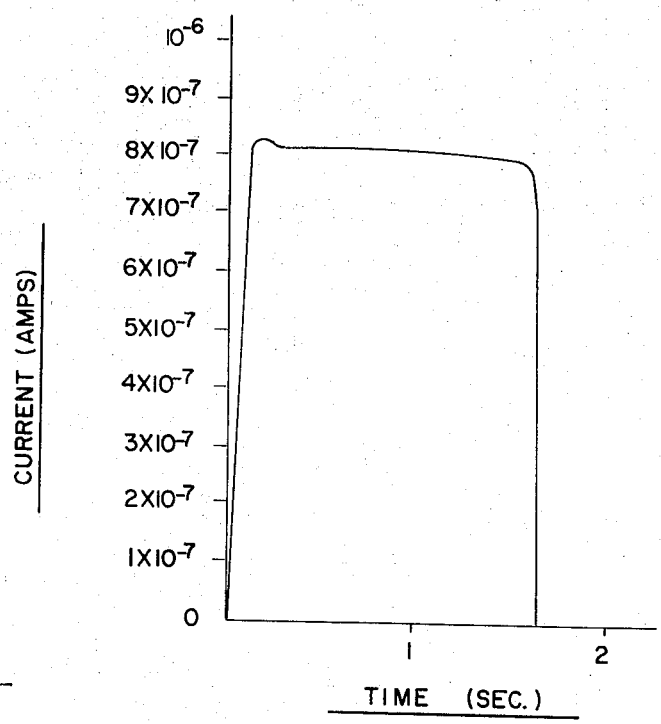

Referring now to FIG. 4, a typical current curve plotted against a time base is illustrated for the system of the invention as used to control an ionographic imaging system such as that of the aforementioned prior patent application. As can be seen in such an ionographic system, the current rapidly rises to a predetermined level or peak and then as it starts to drop from this peak level, the current control takes effect to produce a substantially constant current over the time interval needed (in this instance about 1.75 seconds). At the end of the programmed interval during which the current level is maintained, the current supply is abruptly cut off. In the absence of the feedback control provided by the present system, the ionographic system load current would not be maintained substantially constant, but would drop substantially after peaking.

Thus, the system of this invention provides accurate control of the current supply to a load which rises to a predetermined level, the current being maintained substantially at this level for a predesired time interval, after which the current supply is cut off. The system of the invention accomplishes its control function almost entirely automatically.

While the system of the invention has been described and illustrated in detail, it is to be clearly understood that this is intended by way of illustration and example only and is not to be taken by way of limitation, the spirit and scope of this invention being limited only by the terms of the following claims.

What is claimed is:

1. A system for controlling the supply of current to a load which initially draws current which rises to a predetermined level, comprising:
 a programmable power supply adapted to be energized for supply current to said load;
 means for generating a feedback signal which varies in accordance with the current through said load;
 means for detecting the predetermined level of said feedback signal following energization of said power supply and providing a keying signal when said feedback signal is substantially at said predetermined level, this means comprising latching circuit means for causing said keying signal to be continuously provided upon the detection of said predetermined level;
 control means for controlling the voltage output of said programmable power supply, the control action of said control means being initiated in response to said keying signal, said control means receiving said feedback signal and generating a control signal for said programmable power supply as a function of said feedback signal thereby to control the output voltage of said programmable power supply;

integrator means for integrating the current supplied to said load as a function of time and for generating a control signal in accordance with a predetermined integration of the current supplied at said predetermined level to said load, the integration action of said integrator means being initiated by said keying signal; and switching circuit means responsive to said control signal from said integrator means for cutting off the output of said programmable power supply and thus the current to said load when said predetermined integration has occurred.

2. The system of claim 1 wherein said latching circuit means comprises a flip-flop circuit.

3. The system of claim 1 further including indicator means connected to receive the output of said latching circuit means for indicating detection of said predetermined current level.

4. The system of claim 3 and further including means for resetting said latching circuit means after an operating sequence thereof to prepare said latching circuit means for a new sequence of operation and to turn off said indicator means.

5. The system of claim 4 wherein said reset means comprises manually operable reset switch means for connecting a reset signal to said latching circuit means.

6. The system of claim 4 wherein said reset means comprises a delay circuit for providing a reset signal to said latching circuit after a predetermined delay time interval following energization of said programmable power supply.

7. A system for controlling the supply of current to a load which initially draws current which rises to a predetermined level, comprising:
a programmable power supply adapted to be energized for supply current to said load;
means for generating a feedback signal which varies in accordance with the current through said load;
means for detecting the predetermined level of said feedback signal following energization of said power supply and providing a keying signal when said feedback signal is substantially at said predetermined level;
control means for controlling the voltage output of said programmable power supply, the control action of said control means being initiated in response to said keying signal, said control means receiving said feedback signal and generating a control signal for said programmable power supply as a function of said feedback signal thereby to control the output voltage of said programmable power supply, this control means comprising a differential amplifier, a potentiometer for adjusting the operation point of said amplifier, said amplifier being adapted to be supplied with a voltage which is a function of the load current, and electronic valve means responsive to the output of said amplifier for providing a control signal to said programmable power supply which varies inversely with incipient changes of current to said load;
integrator means for integrating the current supplied to said load as a function of time and for generating a control signal in accordance with a predetermined integration of the current supplied at said predetermined level to said load, the integration action of said integrator means being initiated by said keying signal; and
switching circuit means responsive to said control signal from said integrator means for cutting off the output of said programmable power supply and thus the current to said load when said predetermined integration has occurred; said system further including electronic valve means connected between the input and output of said differential amplifier, said electronic valve means receiving said keying signal as a control signal therefor, said valve means being conductive to provide a bypass circuit across said differential amplifier when said keying signal is not present and being cut off in response to said keying signal.

* * * * *